United States Patent
Scherer et al.

(10) Patent No.: US 6,461,528 B1
(45) Date of Patent: Oct. 8, 2002

(54) METHOD OF FABRICATING LATERAL NANOPORES, DIRECTED PORE GROWTH AND PORE INTERCONNECTS AND FILTER DEVICES USING THE SAME

(75) Inventors: Axel Scherer, Laguna Beach, CA (US); Theodore Doll, Arnstadt (DE); Thomas Hoffman, Leuven (BE)

(73) Assignee: California Institute of Technology, Pasadena, CA (US)

( * ) Notice: Subject to any disclaimer, the term of this patent is extended or adjusted under 35 U.S.C. 154(b) by 113 days.

(21) Appl. No.: 09/699,114

(22) Filed: Oct. 27, 2000

Related U.S. Application Data (60) Provisional application No. 60/162,571, filed on Oct. 29, 1999, and provisional application No. 60/162,569, filed on Oct. 29, 1999.

(51) Int. Cl.[7] ............................................. B31D 3/00
(52) U.S. Cl. ........................... 216/56; 216/17; 216/41; 216/47; 210/490
(58) Field of Search ......................... 216/41, 47, 17, 216/56; 210/490

(56) References Cited

U.S. PATENT DOCUMENTS

| | | | | |
|---|---|---|---|---|
| 3,794,174 A | * | 2/1974 | Booman et al. | 204/638 |
| 4,144,636 A | * | 3/1979 | Burkhardt et al. | 205/124 |
| 5,141,596 A | * | 8/1992 | Hawkins et al. | 216/2 |
| 5,275,693 A | * | 1/1994 | Nakama | 216/42 |
| 5,543,046 A | * | 8/1996 | Van Rijn | 210/490 |
| 6,225,647 B1 | * | 5/2001 | Kurtz et al. | 257/103 |
| 6,309,554 B1 | * | 10/2001 | Fujishima et al. | 216/11 |

* cited by examiner

Primary Examiner—Randy Gulakowski
Assistant Examiner—Shamim Ahmed
(74) Attorney, Agent, or Firm—Daniel L. Dawes; Myers, Dawes & Andras LLP (57) ABSTRACT

Lateral pores in a thin metal film as well as fabricating branching and expanding ore arrays can be fabricated by a method of growing long pores laterally underneath a ask by use of stress compliant masks or varying the anodization voltage. Applications range from use with scanning electron microscope (SEM-compatible single molecule probe stations), to nanowire fixtures and to the use with a "pixelating, nonscanning" near field optical microscope (NOM). Pores are defined by conventional anodization vertically into the underlying membrane of preporous material through any overlying masking layers. The general solution is to utilize mechanically stable masks that withstand the stress during anodization and counteract the pore formation stress to lead to good pore ordering and directed growth. Multilayer masks are well suited for this. With a composition of materials having different elastic properties, tensile stress can be matched to counteract compressive stress caused by porous material growth. The boundary stress problem between preporous and porous material is solved by using a planarizing mask material that provides locally increased masking layer thickness at the critical boundary between nonporous and porous material in the film.

56 Claims, 7 Drawing Sheets

METHOD OF FABRICATING LATERAL NANOPORES, DIRECTED PORE GROWTH AND PORE INTERCONNECTS AND FILTER DEVICES USING THE SAME

The present application relates back to U.S. Provisional Patent Application 60/162,571 filed on Oct. 29, 1999 and to U.S. Provisional Patent Application 60/162,569 filed on Oct. 29, 1999.

BACKGROUND OF THE INVENTION

1. Field of the Invention

2. Description of the Prior Art

Media with long pores are of interest because of their capabilities to sort, direct and mechanically fix smallest chemical or biological units. Various attempts have been undertaken to incorporate porous silicon or porous alumina in microelectronic or microfluidics devices. A remaining problem is that up to now pure aluminum substrates are required and that in all cases anodized pore growth was perpendicular to the aluminum surface. If one were able to make lateral or directed pores in some material, they could be integrated into bio-analytical systems. Additional possible applications arise if pore growth could be directed or pores jointed together in a well-controlled way.

Porous media are also of interest because of their filtering capabilities. Various attempts have been undertaken to incorporate porous silicon or porous alumina in microelectronic or microfluidics devices. Again in regard to porous alumina, one remaining problem is that up to now pure aluminum substrates are required and that in all used cases pore growth was perpendicular to the aluminum surface. If one were able to have lateral or directed pores in some material, they could be integrated into cheap nanofluidic systems.

Much work has been done to explore the growth of vertical pores in alumina and filter membranes using vertical pores in alumina have been developed. All studies use unstructured anodization of pure aluminum sheets as a substrate, as its purity, compactness and polycrystalline arrangement are prerequisite for well-ordered pore growth. One publication reports anodization on a niobium-masked Al substrate and shows short pores that grow isotropically under a mask layer forming random branches under constant voltage and lifting the mask's rim upward.

What is needed is to find a technical way to growing long pores underneath a mask, direct them, leave a vertical entrance direction and obtain well ordered, well-defined spreading or joining/branching pore structures.

What is further needed is a method to fabricate in-plane filters by opening the endings of lateral pores. The elements should be formed in a monolithic, compatible process and combined with fluidic inlets and outlets. Finally methods of integration these filters into planar fluidic systems are needed to make them suitable for use in cheap nanofluidic systems.

BRIEF SUMMARY OF THE INVENTION

The invention is a method for forming a lateral pore in a film having an in-plane extent and a vertical direction perpendicular thereto comprising the steps of disposing a stress compliant mask on the film, defining a vertical hole through the stress compliant mask and into the film, and forming a lateral pore in the film by anodization.

The method further comprises the step of disposing a polymer layer on the stress compliant mask. The film has regions which will be porous and nonporous, which regions have at least one boundary between them. The stress compliant mask disposed on the film comprises is a planarized stress compliant mask disposed over or on the boundary of the film between of nonporous regions and porous regions. The step of disposing the stress compliant mask on the film comprises disposing on the film multiple composite mask layers. The multiple composite mask layers comprise at least a first layer bearing high intrinsic tensile stress and adjacent thereto at least a second layer bearing compressive stress. In one embodiment the multiple composite mask layers comprise at least a $SiO_2$ layer and disposed adjacent thereto at least a Si layer. In another embodiment the multiple composite mask layers comprise at least a SiC layer and disposed adjacent thereto at least a Si layer. In still a further embodiment the multiple composite mask layers comprise at least a $Si_3N_4$ layer and disposed adjacent thereto at least a $SiO_2$ layer. In any case the stress compliant mask on the film is a mechanically stable mask which withstands stress during anodization and counteracts pore formation stress to lead to pore ordering and directed growth. In other words the multilayer mask on the film has a composition of materials with different elastic properties such that tensile stress in the film is at least approximately matched to counteract compressive stress in the film caused by porous material growth. The disposition of the planarizing mask material provides locally increased masking layer thickness at the boundary between nonporous and porous material in the film.

The method further comprises annealing the film to improve its polycrystalline structure and prepare it for ordered pore growth, and/or disposing a passivating layer on the film to avoid oxidation during annealing.

The step of forming the lateral pore in the film by anodization comprises defining a start hole through the stress compliant mask and then anodizing the film through the start hole with an approximately constant anodizing voltage. In another embodiment the step of forming the lateral pore in the film by anodization comprises defining a start hole through the stress compliant mask with a nonrectangular geometry of a pore formed thereby and then anodizing the film through the start hole with a time varying anodizing voltage dependent on the nonrectangular geometry. When the nonrectangular geometry is trapezoidal, the anodizing voltage, V, is varied as determined by the equation $dy/dx$ $(V_0 v)/y_0 = dV/dt$, where $dy/dx$ is the change of width of the pore with respect to length of the pore, $V_0$ is the starting anodizing voltage, v is the rate of pore growth, and $y_0$ is the starting width of the pore. When the nonrectangular geometry is circular, the anodizing voltage, V, is varied as determined by the equation, $dV/dt = \pi V_0 v/y_0$, where $V_0$ is the starting anodizing voltage, v is the rate of pore growth, and $y_0$ is the starting diameter of the pore.

In another embodiment the step of disposing a stress compliant mask on the film comprises disposing a stress compliant mold on the film, or disposing a stress compliant mold on the stress compliant mask.

The method further comprises the step of removing the stress complaint mask including the vertical hole defined therein and all other structures adjacent to the lateral pore except for a wall a nonporous material adjacent to the lateral pore to create at least one lateral test tube. The test tube can be loaded with a microsample by electromigration. The microsample can be read, marked, modified or cut in the test tube by means of scanning electron microscopy. The microsample in the test tube can also be read by means of a near field optical microscope. An aperture can be defined in the test tube for disposition of a tip of an atomic force microscope therein and the microsample read, or modified in the test tube by means of atomic force microscopy.

The lateral pore has a first and second end and the method further comprises the steps of opening the first and second end of the pore, and disposing a wire in the pore. The wire has a first and second opposing end. The first and second opposing end of the wire is connected to electrical contacts. The first and second opposing end of the wire may be connected with the electrical contacts either by forming the electrical contacts adjacent to the first and second opposing end of the pore prior to the wire being disposed therein and contacting the first and second opposing end of the wire with the previously formed electrical contacts, or by forming the electrical contacts adjacent the first and second opposing end of the pore after to the wire is disposed therein and contacting the first and second opposing end of the wire with the subsequently formed electrical contacts.

The method further comprises forming at least two interconnected lateral pores in the film. In one embodiment the interconnected lateral pores in the film are formed by selectively disposing prior to anodization at least two interconnected nonporous channels of anodizable material in the film. In another embodiment the interconnected lateral pores are formed in the film by anodizing the pores in the film by a first electric field pattern and anodizing an interconnection between the at least two pores by a second electric field pattern. The first and second electric field patterns have differing field orientations with respect to each to cause the at least two pores defined by the first electric field pattern to interconnect when further formed by the second electric field pattern.

The method further comprises the steps of disposing a first linear sample into a first one of the at least two interconnected lateral pores in the film by driving the first linear sample therein in a first direction. A second linear sample is disposed into a second one redo of the at least two interconnected lateral pores in the film by driving the second linear sample therein in a first direction. The first and second linear samples are joined together to form a junction between them by driving the first and second linear samples is a second direction opposing the first direction so that the first and second linear samples are driven together.

A plurality of lateral pores are formed in a two dimensional array having a corresponding first array of pore openings and the method further comprises growing the two dimensional array of lateral pores into a corresponding spreading two dimensional array of lateral pores in the film by varying anodization voltage during growth such that a larger corresponding second array of pore openings is formed in communication with the first array of pore openings. In one embodiment the method further comprises filling the lateral pores communicating the first array of pore openings with the second array of pore openings with a conductive material to form a multiprobe stage. In another embodiment the method further comprises filling the lateral pores communicating the first array of pore openings with the second array of pore openings with a transparent material and coupling the pore openings of the second array with a near field optical microscope to form a nonscanning pixelated SNOM. The method further comprises using the lateral pores communicating the first array of pore openings with the second array of pore openings as fluidic channels to form a liquid probe array.

The method further comprises the step of defining another vertical hole through the stress compliant mask and into the film adjacent to an end of the lateral pore so that the lateral pore is opened at both opposing ends.

The method still further comprises simultaneously forming at least two collinear lateral pores in the film in opposing collinear arms of a tee-shaped film having a central arm extending perpendicularly from and between the two opposing collinear arms of the tee-shaped film, and applying an anodizing voltage to the central arm during further growth of the at least two collinear lateral pores into the central arm so that the collinear lateral pores interconnect with each other so that an open filter element is formed in the tee-shaped film.

In one embodiment the lateral pore has a closed backside and the method then further comprises opening the closed backside of the lateral pore by etching away nonporous material under the stress compliant mask adjacent to the closed backside to open the lateral pore at both ends. The method further comprising the step of disposing an etch-resistant layer beneath an anodizing electrode used in formation of the lateral pore.

In the embodiment where the stress compliant mask is an anodization hardmask and the method further comprises the step of removing a nonporous block under the anodization hardmask and then forming the lateral pore in nonporous material previously adjacent to the nonporous block so that a fluidic channel is formed laterally underneath the anodization hardmask.

In the embodiment where the stress compliant mask is an anodization hardmask and in one embodiment the method further comprises removing a sacrificial block under the anodization hardmask and then forming the lateral pore in material adjacent to the sacrificial block so that a fluidic channel is formed laterally underneath the anodization hardmask. The method further comprises disposing a molding over the anodization hardmask and fluidic channel.

In one embodiment the method further comprises the step of forming at least two lateral pores in the film by anodization at different times. The two lateral pores have correspondingly different diameters so that lateral filters of different sizes are formed.

The method further comprises forming at least two lateral pores in the film by anodization with different electric fields. The two lateral pores have correspondingly different diameters so that lateral filters of different sizes are formed. In one embodiment the method further comprises providing a voltage divider, forming at least two lateral pores in the film by anodization with different electric fields where the different electric fields provided by corresponding different electrodes adjacent to the film. The corresponding different electrodes are coupled to the voltage divider. The two lateral pores have correspondingly different diameters so that lateral filters of different sizes are formed. The method further comprises using the anodizing electrode and etch-resistant layer as a passivated electromigration electrode for the adjacent opened pore.

The method further comprises the steps of forming a plurality of the lateral pores to create a lateral filter in a fluidic channel within the film and vapor pumping liquid through the filter. The fluidic channel has at least one outlet port and the method further comprises the step of forming another plurality of the lateral pores to create a filter at the at least one outlet port so that an evaporator membrane is formed for the vapor pumping. In the illustrated embodiment the step of forming the plurality of the lateral pores to create a lateral filter in a fluidic channel and forming the other plurality of the lateral pores to create a filter at the at least one outlet port are performed simultaneously. The method further comprises providing an external flap disposed over the filter at the at least one outlet port for evaporation control.

The invention is also understood to comprise the apparatus which are formed by the foregoing methods of fabrication. In addition, although the invention has been described as be fabricated by a combination of steps, it is to be expressly understood that the claims of the invention are not to be construed as limited by the specification under 35 USC 112 but include all methodologies and structures falling within the definition of the claim wording. The invention can now be better visualized by turning to the following drawings wherein like elements are referenced by like numerals.

The invention and its various embodiments can now be understood by turning to the following detailed description of the preferred embodiments

DETAILED DESCRIPTION OF THE PREFERRED EMBODIMENTS

A method of growing long pores laterally underneath a mask is described. By use of stress compliant masks or varying the anodization voltage, lateral pores in a thin metal film can be fabricated as well as fabricating branching and expanding pore arrays in general. Applications range from use with scanning electron microscope (SEM-compatible single molecule probe stations), to nanowire fixtures and to the use with a "pixelating, nonscanning" near field optical microscope (NOM).

The problem of growing long pores laterally underneath a mask with a vertical entrance direction, controlling the pore's direction of growth and obtaining well ordered, well-defined spreading or joining/branching of pore structures can be solved by understanding that ordered pore formation arises from the compressive stresses that keeps the pores together or that directed electrical fields align the pores. Secondly, in polycrystalline material, grain boundaries must be very tight in order to avoid accelerated pore formation in them which would lead to deviations in the direction of the pore growth.

For compressive stress-ordered porous media like alumina, the masks have to withstand a high lateral and vertical stress as pore growth takes place underneath. The highest stress normally occurs at the boundaries of preporous material 12 such as in region 10 in FIG. 1 in side cross-sectional view. Pores 14 are being defined by conventional anodization vertically into the underlying membrane of preporous material 12 through any overlying masking layers. As typical, masking materials like SiC and $Si_3N_4$ in micromachined substrates or materials already bear high intrinsic tensile stress. Multiple layers of such masking materials tend to rupture with increased thickness, which rupture initiates defective pore growth. On the other hand, deposited compressive $SiO_2$ masking layers bend and poorly counteract the pore formation stress. This leads to less well ordered pores 14. Especially under tensile stress, pinholes develop through the masking layers that initiate electrical breakthrough due to the high electrical field applied during anodization of material 12 to form pores 14. Etch resistant metal masks disturb the electrical field distribution that is intended to form pores 14 in a electrically neutral environment or field for unidirectional pore formation.

The general solution provided here is to utilize mechanically stable masks that withstand the stress during anodization and counteract the pore formation stress to lead to good pore ordering and directed growth. Multilayer masks are well suited for this. With a composition of materials having different elastic properties, tensile stress can be matched to counteract compressive stress caused by porous material growth.

The boundary stress problem between preporous and porous material is solved by using a planarizing mask material that provides locally increased masking layer thickness at the critical boundary between nonporous and porous material in the film. An example of such a planarizing mask material that provides locally increased masking layer thickness is $Si_3N_4$ or $SiO_2$.

Figure 1:
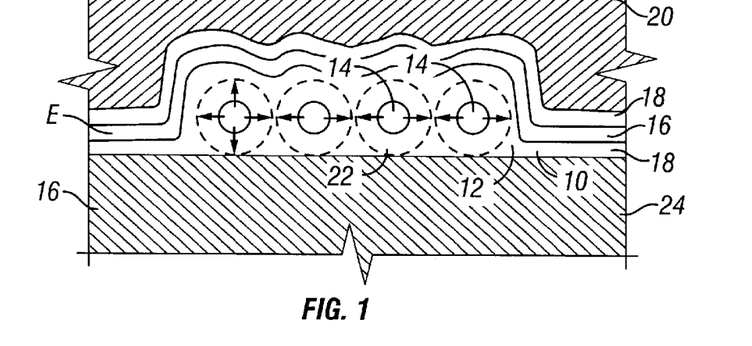
FIG. 1 is a side cross-sectional view of a semiconductor membrane in which lateral pores have been defined.

An example is illustrated in FIG. 1 which shows lateral pores 14 being defined in a film 22 disposed on a substrate 16. A thick pure metal substrate, such as porous alumina film 22, is disposed by physical vapor deposition of aluminum on anodization-resistant substrates 24 followed by subsequent annealing of film 22. Substrate 24 is comprised of glass or glass covered with $SiO_2$, or silicon covered with SiC, $Si_3N_{41}$ or $Si_3N_4$ on $SiO_2$. Annealing of the aluminum improves its polycrystalline structure and prepares it for ordered pore growth. Four hours of annealing at 400° C. in a nitrogen atmosphere is sufficient to anneal a 200 nm Al layer. An additional 100 nm $SiO_2$ passivating layer disposed thereon has been found effective to avoid Al oxidation due to oxygen traces during annealing.

Layers of approximately 100 nm $SiO_2$ 16 are alternated with 30 nm layers 18 of Si and combined with a top layer of thick photoresist 20. The number of layers are chosen according to the pore structure which is being formed in film 22. The thin multilayer structure 16, 18 carries the strain whereas resist layer 20 reduces electrical field strength and shields remaining defects. Other multilayer combinations include $Si_3N_4$—Si, SiC—Si or $Si_3N_4$—$SiO_2$. This by no means exhausts the multiple layer combinations which can be employed in the invention. Any other multiple layer structures which provide equivalent strain carrying ability as may be known in the art or later devised may be substituted.

Figure 2A:
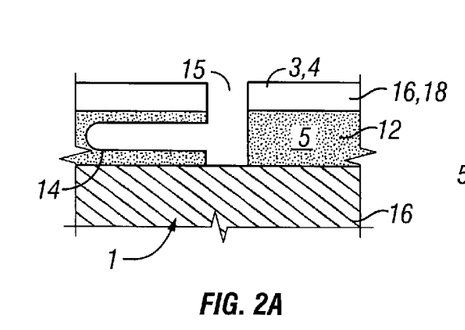
FIG. 2a is a side cross-sectional view of a semiconductor membrane in which a starting pore from which a lateral pores will be created has been defined.

Such metal films and masks 16, 18 as described above are well suited for lateral pore growth as diagrammatically depicted in FIG. 2a. Starting holes 15 are vertically etched through masks 16,18 to obtain access to preporous material 12 and the usual anodization step is then carried out to define lateral pore 14 through material 12. In order to reduce the increased mask bending at its rim, preporous material 12 may be recessed or undercut away from the opening defining start hole 15 through masks 16, 18. This can be done easily by etching preporous material 12.

Figure 2B:
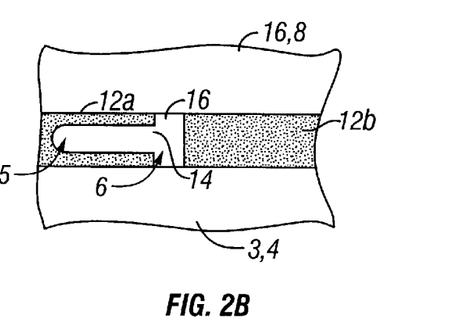
FIG. 2b is a side cross-sectional view of a semiconductor membrane in which a starting pore has been defined.
Figure 8:
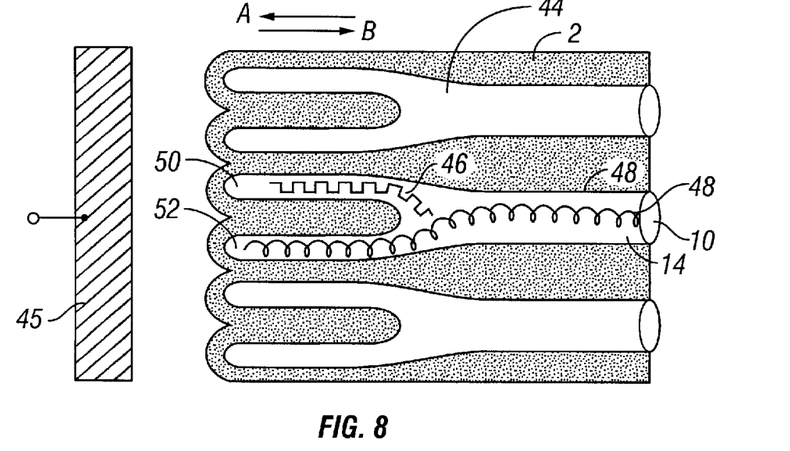
FIG. 8 is a cross-sectional side view of branching nanotubes used for joining nanowires or molecular samples into y junctions.

Well-ordered pores 14 will be obtained by using the following design rules or a combination of them: (1) branching as shown in FIG. 8 starts when a pore 14 grows into material with a lower compressive stress from neighboring pores, which is provided according to the pore pattern which is selectively lithographically defined through the masking layers; and (2) to obtain parallel pores 14 all connected areas of alumina must have a rectangular shape for constant voltage anodization, which is the commonly used method. Two of those areas have been drawn beginning with a starting hole 15 in FIG. 2b. The two lateral areas 12a and 12b are shown by the dashed lines in the top view of FIG. 2b and will define the lateral directions in which pore 14 is grown by anodization.

Figure 3A:
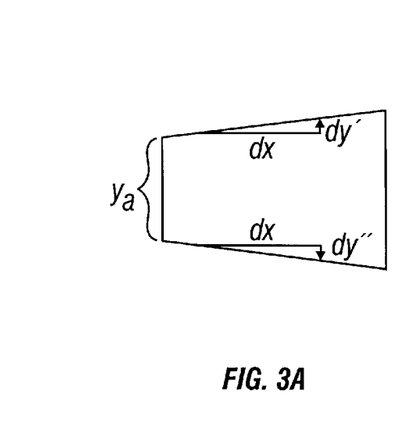
FIGS. 3a–3b is a diagram of a trapezoidal starting hole illustrating the variation of voltage during anodization which is required when growing pores on nonuniform cross section.

For a trapezoidal or circular alumina areas using a small starting hole 15 within a larger area, a constant number of pores with changing pore size and distance is achieved by a continuously varying the voltage during anodization. As diagrammatically depicted in the plan view of FIG. 3a the time rate of change of voltage (dV/dt) which is to be used depends on the growth rate v in the x direction, the growth rate in the x direction dy/dx (where dy=dy'+dy", the initial aluminum starting width or diameter $y_0$, and the starting voltage $V_0$ as given by:

$$dy/dx\ (V_0 v)/y_0 = dV/dt,$$

Figure 3B:
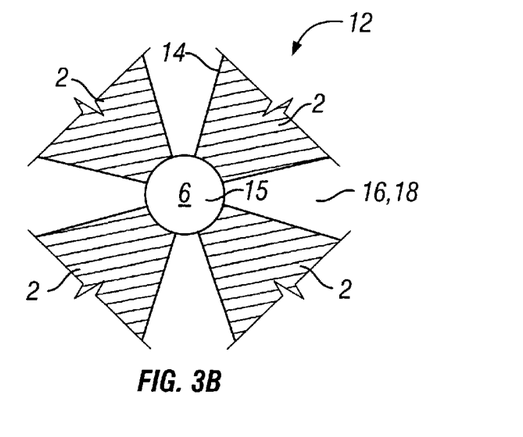

In FIG. 3b a start hole 15 in a larger circular area 15' of material is defined and cut down through masks 16,18 to preporous material 12 which is selectively disposed on substrate 16 in the form of annular sectors of a circle. Anodization of preporous material 12 through start hole 15 with the varying voltage stated above, will result in a circular array of "sun beam shaped" lateral pores 14. Similar variation of the voltage based on the above principles can be generalized to pores of arbitrarily shaped cross sections.

Figure 4:
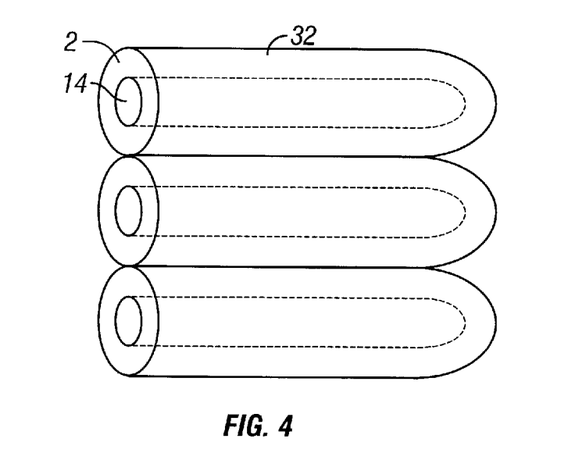
FIG. 4 is a perspective diagram showing nanotubes in which pores have been defined as a nano test tube.

Lateral pores may be used as atto-liter test tubes as diagrammatically depicted in FIG. 4. Nonporous material 12 surrounding pore 14 as shown in FIG. 1 forms what becomes a test tube wall 32 as shown in FIG. 4 when the layers 16, 18 surrounding film 22 and substrate 16 are removed. In an idealized form, stripped film 22 with lateral pores 14 defined therein form an array of atto-sized test tubes in FIG. 4.

Figure 5:
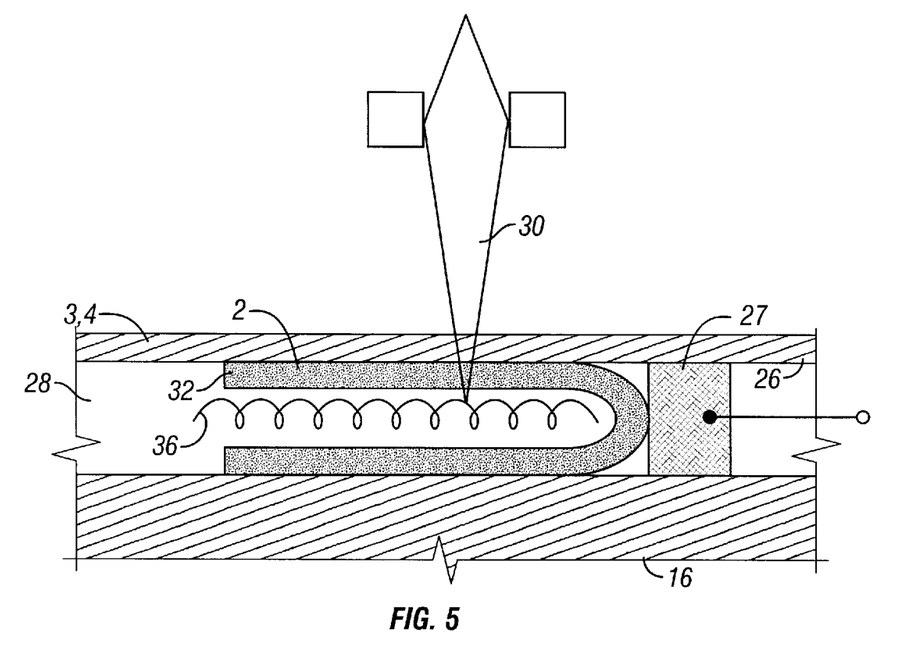
FIG. 5 is a cross-sectional side view of a nano test tube of FIG. 4 used to hold molecular sized samples for testing with scanning electron microscopes.

These atto-sized test tubes provide containers for several or for single molecules 36, which may be driven into the tubes by electromigration when used in an alternative form as diagrammatically depicted in FIG. 5. In FIG. 5 the remaining layers of FIG. 1 are left intact, and in this case an electrical contact 27 is formed close to outer pore bottom 26. The liquid content 28 disposed into a single layer of lateral pores 14 may be examined by a scanning electron microscope (SEM) 30, or a scanning near field optical microscope (SNOM) through the pore walls 32. SEM 30 is able even to mark or cut molecules 36 by conventional means.

Figure 7:
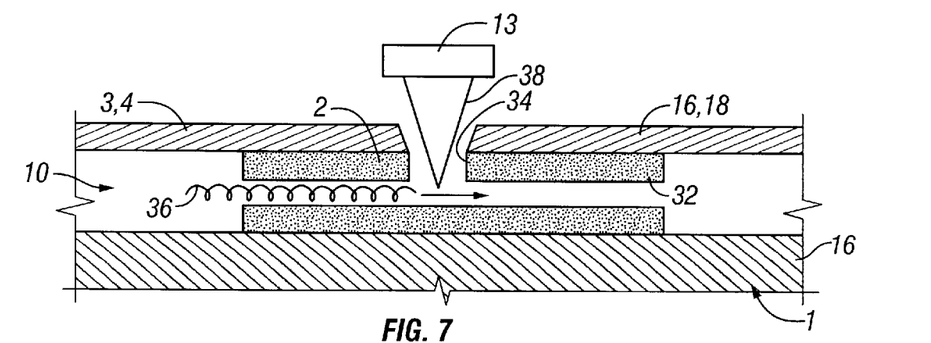
FIG. 7 is a cross-sectional side view of a nanotube which has been modified to allow testing of a molecular sample with an atomic force microscope.

In another application similar to the structure of FIG. 5 as shown in FIG. 7 a small opening 34 is defined in a pore wall 32 to provide a mechanical fixture for holding molecules or bacteria/viruses 36 for examination or modification by an atomic force microscope (AFM) tip or scanning tunneling microscope tip 38.

Figure 6A:
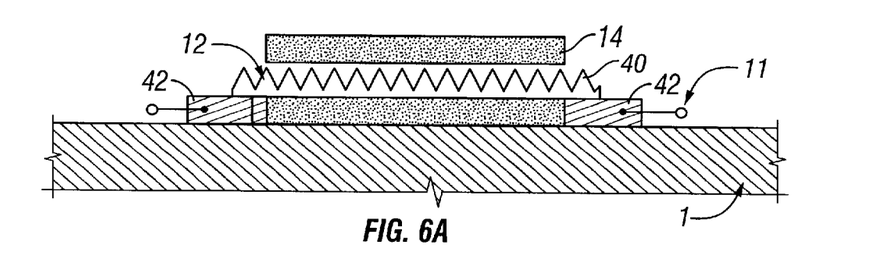
FIG. 6a is a cross-sectional side view of a nano tube which has been opened at both ends used to provide a mechanical fixture for a nanowire between two prefabricated electrical contacts.
Figure 6B:
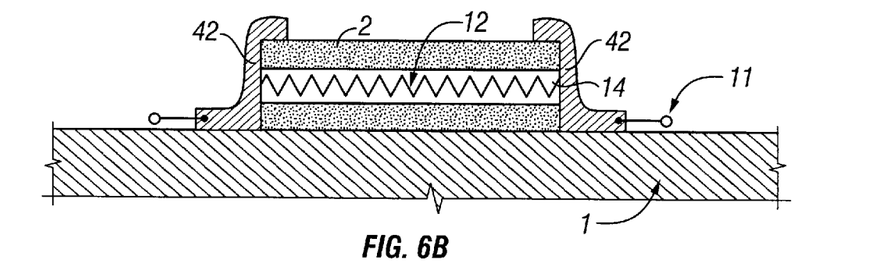
FIG. 6b is a cross-sectional side view of a nano tube which has been opened at both ends used to provide a mechanical fixture for a nanowire between two electrical contacts fabricated after the placement of the nanowire into the nanotube.

Lateral nanopores 14 as depicted in FIG. 6 may also act as mechanical fixation device for nanowires 40, especially for pores defined in alumina since it will be an insulating material after thermal treatment. Pores 14 can be used to align one or several nanowires 40 in parallel. Electrical contacts 42 at both ends of nanopores 14 may be structured for connecting wires 40 in advance as shown in FIG. 6a or after disposing wire 40 into pore 14 as shown in FIG. 6b.

As described above, a varying material geometry and/or anodization voltage can result in controlled or directed pore branching to form pore y- interconnects 44. In fluidic systems these y-interconnects 44 as shown in FIG. 8 may be used for linearly joining molecules to another according to the zip-fastener principle. After driving a short molecule 46 into one branch 50 in direction A by means of electromigration using electrode 45 a longer molecule 48 may be driven into the remaining long branch 52 and pore 14 means of electromigration. By reversing the driving force exerted by electrode 45 in direction B, both molecules will be joint together. Also y-interconnects 44 of nanowires 40 can be fabricated in the same way.

Figure 9A:
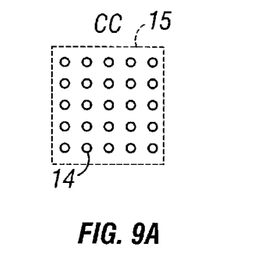
FIG. 9a is a top plan view of a two dimensional nanoarray of pores as seen through section lines 9a—9a of FIG. 9b.
Figure 9B:
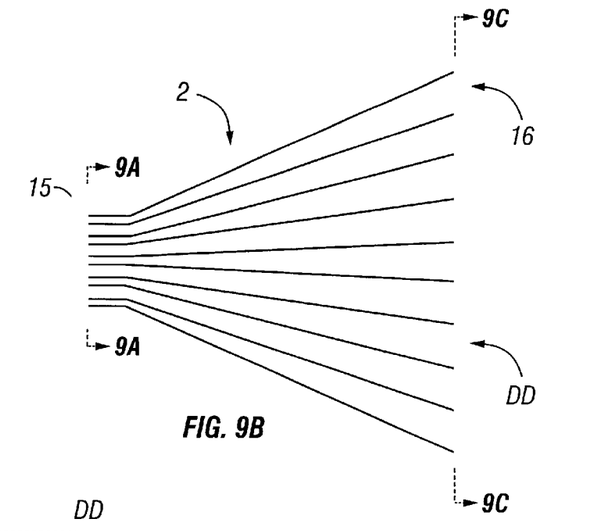
FIG. 9b is a cross-sectional side view of a laterally expanding array of nanopores fabricated according to the invention.
Figure 9C:
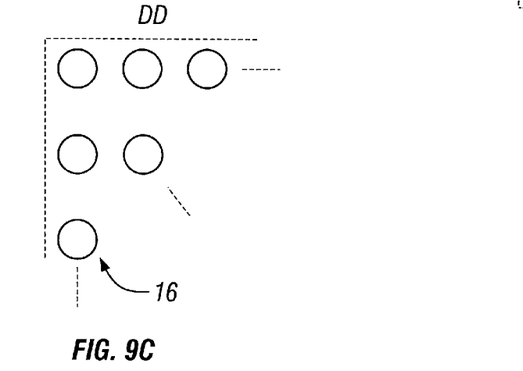
FIG. 9c is a top plan view of a two dimensional microarray of pores as seen through section lines 9c—9c of FIG. 9b.
Figure 10:
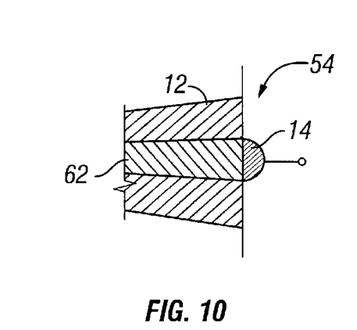
FIG. 10 is a cross-sectional side view of an electrical device connection to a filled pore.

The anodization mode of an expanding array of pores as shown in FIGS. 9*a*, *b* and *c* may also be used to enlarge a small one- or two dimensional array of pores 14 which are shown in FIG. 9*a* in top plan view as seen through section lines 9*a*—9*a* of FIG. 9*b* into enlarged microscopic dimensions as shown in cross-sectional side view in FIG. 9*b* and in top plan view as seen through section lines 9*c*—9*c* of FIG. 9*c*. For example, a 50×50 array of alumina pores 14 in FIG. 9*a* with an interpore distance of 100 nm may be enlarged by laterally growing pores 14 under a voltage variation to an array having 2 μm interpore distances as shown in FIG. 9*c*. A planar array of these dimensions could easily be connected by a microelectronic chip 54 as shown in FIG. 10. Thus, by electroplating a metal filler 62 into these pores 14 an electronic adapter/interface to the smaller array can be formed.

Figure 11:
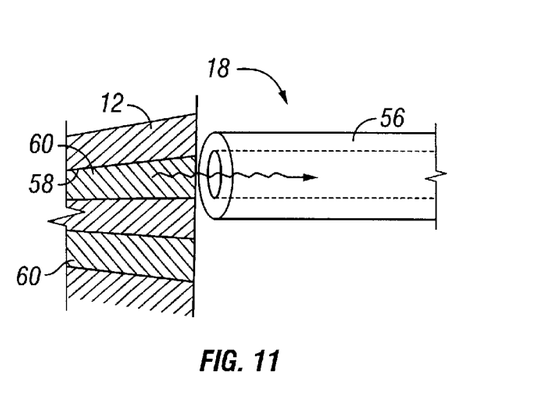
FIG. 11 is a cross-sectional side view of an optical device connection to a filled pore.

Alternatively, by filling pores 14 with transparent material 60, a non-scanning "SNOM" can be realized as shown in FIG. 11, which uses shrinking pores 14 as wave guides towards "pixels" of an near-field optical probing stage and which may be read out by means of a fiber or CCD 56. Transparent material 60 with indexes of refraction lower than the porous material 12 may be advantageously used by plating the inner tubes walls 58. For fluidic applications attachment of micro capillaries to hollow pores 14 will provide a nanoprobing test stage.

Additional applications include the fabrication of filters using lateral pores. Based on the technique of making lateral pores in thin films various ways of fabricating lateral filter elements are described below. Within the scope of the same methodologies connecting fluidic channels, filter arrays and vapor pressure-pumped concentrators can also be fabricated. The terms, "pores" and "filter" will be used hereinafter interchangeably in that in a fluidic system one or more pores can be consider to act as a fluidic filter.

Figure 12A:
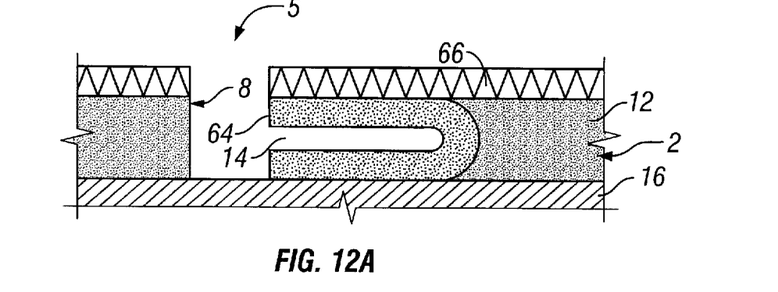
FIG. 12a is a cross-sectional side view of a lateral pore formed in a thin film with a single opening communicating with one pore end.

As pores 14 are formed underneath a mechanical stable mask 16, 18, some access to pores 14 has to formed as well as a pore opening 64 has to be provided with respect to mask 16, 18 as shown in the side cross-sectional diagrammatic view of FIG. 12*a*. A fourfold way of opening the endings of lateral pores is disclosed.

Figure 12B:
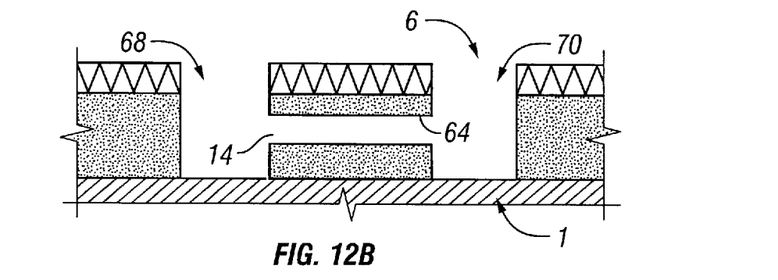
FIG. 12b is a cross-sectional side view of a lateral pore formed in a thin film with two openings communicating with both pore ends respectively.

As shown in FIG. 12*a*, preporous material 12, deposited on substrate 16 is covered by a hard mask 66 and is anodized via an opening 64 through mask 66. At this point in the method preporous material 12 and the mask 66 communicate pore opening 64 with another vertical hole 68 through mask 66 down to substrate 16. By this opening 68 and an opposing identical opening 70 at the opposing end of pore 14 both pore ends 64 are opened as depicted in FIG. 12*b*. The second hole 70 may act as a fluid outlet or may be closed with a cap.

Figure 13A:
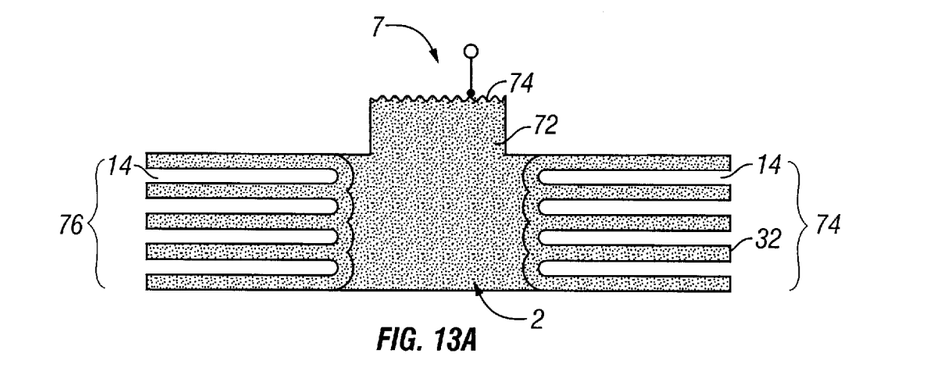
FIG. 13a is a cross-sectional side view of a lateral pore structure having two opposing fluidic channels prior to connection of the two opposing fluidic channels.
Figure 13B:
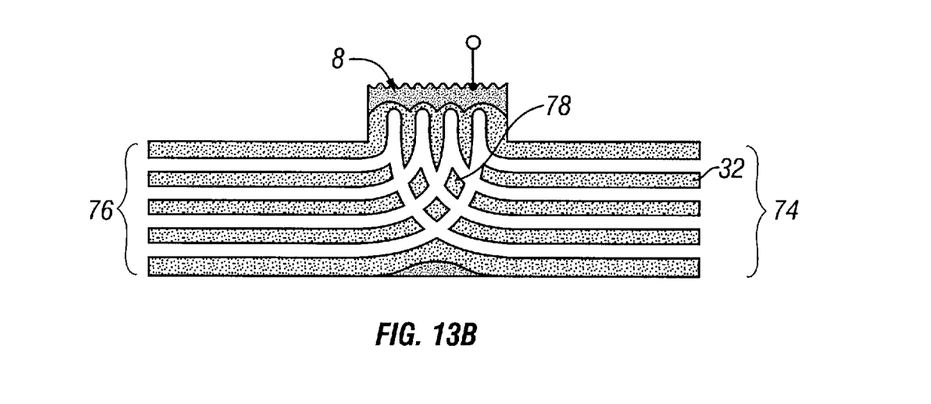
FIG. 13b is a cross-sectional side view of a lateral pore structure of FIG. 13a in which the two opposing fluidic channels have been interconnected.

Another way of opening pores 14 is depicted in FIGS. 13*a* and *b*, which show a top cross-sectional view of a partially anodized preporous structure 72 having a lateral electrical contact 74. With anodization completed, pores 14, coming from both sides of the lateral fluidic channels 74 and 76, will merge and enter the tee-midpiece 72. At this point in the method, anodization is stopped. The area where pores 14 merge will have only small remainders 78 of former pore walls 32. They will not hinder the fluid flow nor affect the filter characteristics.

Figure 14A:
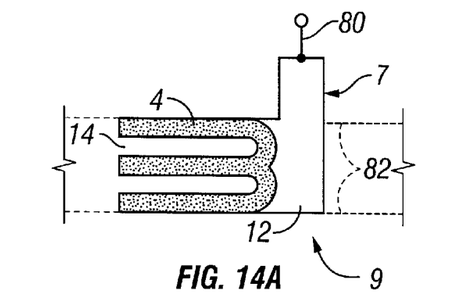
FIG. 14a is a cross-sectional side view of a lateral pore structure in which a fluid channel comprised of an array of parallel pores have been formed.
Figure 14B:
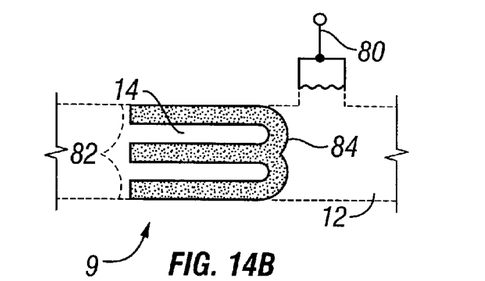
FIG. 14b is a cross-sectional side view of the lateral pore structure of FIG. 14a in which the pore wall ends have been exposed after a first etch.
Figures 14C, 14D:
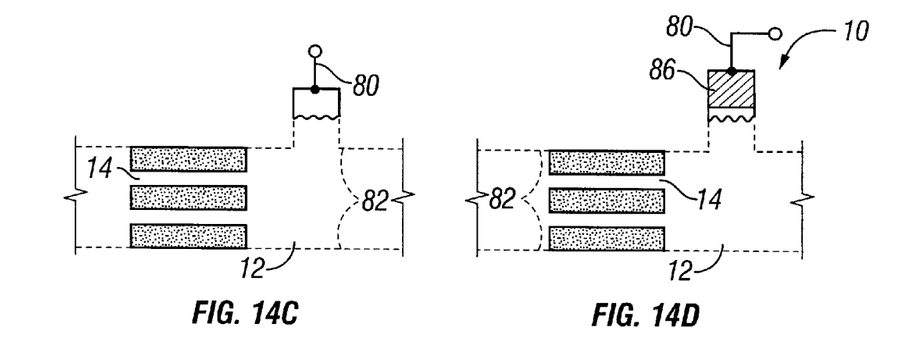
FIG. 14c is a cross-sectional side view of the lateral pore structure of FIG. 14b in which the pore wall ends have been opened after a second etch.
FIG. 14d is a cross-sectional side view of the lateral pore structure of FIG. 14b in which the pore wall ends have been opened after a second etch and the electrical contact has been fabricated from an etch resistant material.

A third and fourth embodiment of the invention make use of a liquid chemical etch. In FIG. 14*a* pores 14 have already been formed in a preporous structure 12 having an electrical contact 80. Pores 14 are aligned along a lateral flow channel, which is indicated by the dotted lines 82. For opening pores 14 the remaining preporous material 12 has to be etched away by a liquid chemical coming from the right portion of the channel 82 as shown in FIG. 14*b*, leaving pore endings 84 bare. Pore endings 84 can be removed in a second etching step which opens the filter pores 14 as shown in FIG. 14*c*. During the process of opening the ends of pores 84, electrical contact 80 will be attacked, leading possibly to formation of an undefined fluidic stack hole, which would be a vertical hole or passage from channel 82 to the position of the etched contact 80, which might be an unintended structure. To avoid the situation of FIG. 14*d*, the material of electrical contact 80 may be chosen to a material 86 that easily withstands both etches.

Figure 15:
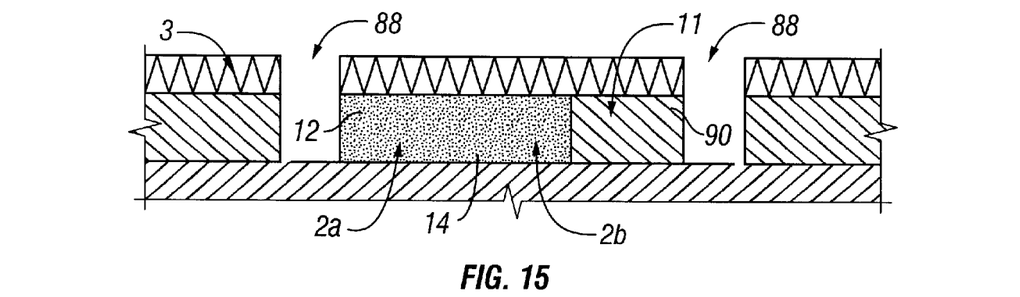
FIG. 15 is a cross-sectional side view of an thin film in which a filter will be defined.

Because both ends of the openings to lateral filter elements can be opened various fluidic filter systems may be advantageously fabricated. A process using the hard mask 66 deposition on an all-preporous blocks 12 can achieve a long channel filter system as shown in FIG. 15. Vertical openings 88 are used define inlets to preporous region 12 which shall become a hollow channel by being etched away while the remainders 14' is made porous and opened by one of the method described above.

Alternatively, instead of etching preporous region 12 another sacrificial material region 90 can be deposited adjacent to filter 14' in such a way that both filter 14' and sacrificial region 90 form a block. Photoresist may act well as sacrificial material 90. This technique of anodizing from one direction only allows the ends of continuous filter elements 14 to be positioned independently without regard to the length of etching path. Otherwise, if etching occurred simultaneously from opposing ends of a channel to the center, the anodizing must stop at the center when the anodized ends of the filter elements meet. Connection between adjacent filter elements can then only be made by removal of the ends of both of the adjacent filter elements, leaving a small common chamber communicating all filter elements together.

Figure 16:
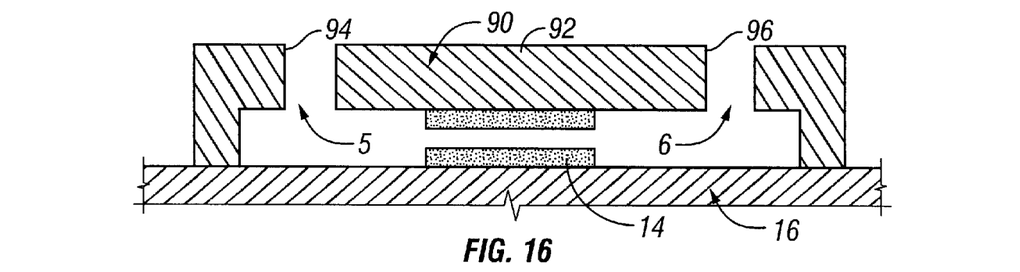
FIG. 16 is a cross-sectional side view of a mold encapsulate filter.

If hard masks 66 are not to used for formation of the whole fluidic system as shown in FIG. 16, a polymer mold 92 may be placed on the substrate 16 bearing the filter element 14. Again it is favorable to mold the polymer around a block according to the method of FIG. 15. Etching of the channels may be done by using fluid inlet 94 and outlet 96 as well as the anodization process. In this case mold 92 encapsulates the hard-mask-covered preporous structure described in FIG. 15.

Figure 17:
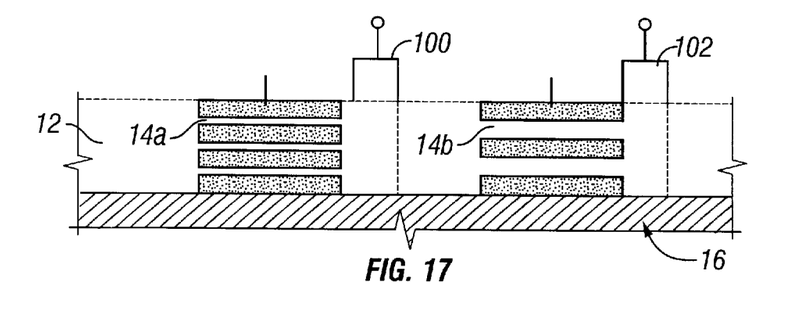
FIG. 17 is a cross-sectional side view of a fluidics channel in which filters of different pore sizes are manufactured in the same fabrication process.

It is also possible to fabricate filters 14*a* and 14*b* of different pore sizes during the same manufacturing step as shown in side cross-sectional view in FIG. 17. On a substrate 16 which contains multiple fluidic structures, all preporous structures 12, which will have the same pore size defined therein, are electrically coupled together by means of electrical contacts 100 or 102. Each preporous structure 12 in which different pore sizes or filter elements 14*a* or 14*b* will be defined, are separated from each other. To perform anodization, several corresponding electrical contacts 100 and 102 are provided on substrate 16 with each set of contacts coupled to a different anodization potential corresponding to the desired pore size. For example, contact 100 is provided with a first anodizing voltage which wilt cause filter elements 14 to be created which have a different pore size than filter elements 14b which are defined by the voltage applied to contact 102. FIG. 17 shows filter elements 14a and 14b having been fabricated only to one side of their respective electrical contacts 100 and 102, but it is also possible that identical filter elements 14a and 14b could be symmetrically fabricated to both sides of an anodizing channel from electrical contacts 100 and 102. Electrical contacts 100 and 102 would also normally be removed at least in part from substrate 16 after the formation of filter elements 14a and 14b, but they have been left in the depiction of FIG. 17 to illustrate their positional relationship to filter elements 14a and 14b.

Given the case that substrate 16 already bears additional electronic elements, it will be advantageous to have a voltage divider on the substrate which reduces the number of required contacts to two. Also, passivated electromigration electrodes 100 and 102 may be incorporated into the systems by using contacts formed according to the methods of FIGS. 13a and b or FIGS. 14a–d.

Figure 18:
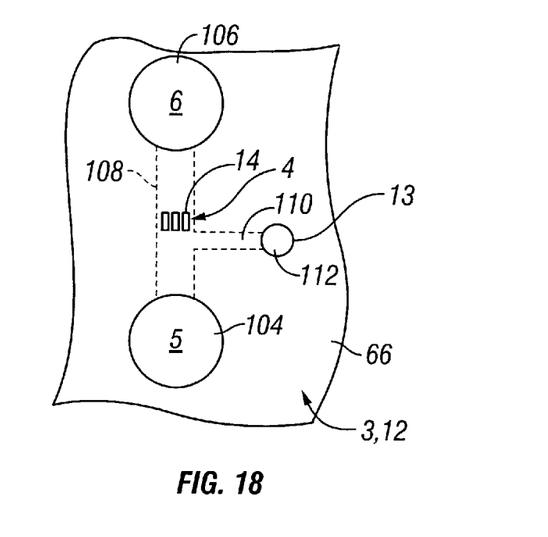
FIG. 18 is a top plan diagrammatic view of a concentrator using a filter of the invention.

Highly functionalized devices become feasible with lateral porous filter elements. FIG. 18 shows a basic structure of a planar concentration stage made of hard mask 66 or molding material 92. As seen in top view, an inlet opening 104 is communicated by a buried fluidic channel 108 with an outlet 106. A filter 14 is placed in channel 108 just downstream from a tee connecting channel 110 with additional outlet 112. The working principle is as follows. Particles in a liquid enter fluidic channel 108 via inlet 104 and are retained in front of filter 14 while the liquid exits through normal outlet 106. Additional outlet 112 is closed during this filtering step. To obtain collection outlet 106 will be closed and tee outlet 112 opened so that the flux direction is reversed. This flushes the particles in a bunch towards outlet 112.

Figure 19:
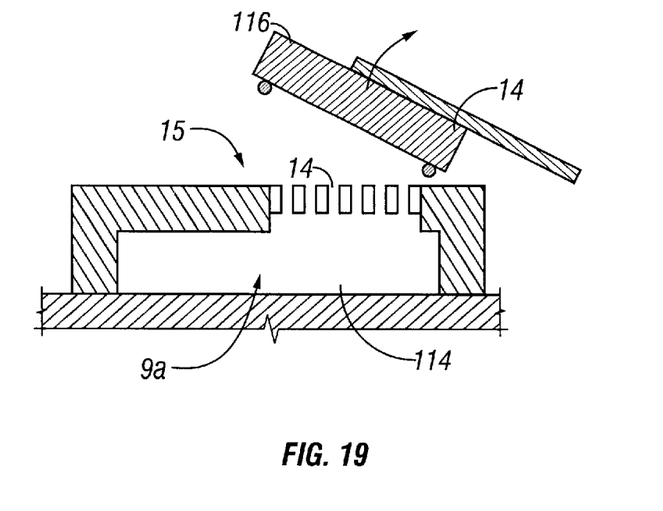
FIG. 19 is a cross-sectional side view of a structure used to define the liquid's surface by surface tension at the outlets of the device of FIG. 18.

Vapor pressure pumping may be used as the driving force for the liquid flow. That is, an excess amount of liquid is provided into inlet 104 flooding by capillary force channel 108 as well as the outlet 106 and having it slowly evaporated at outlet 106, which sucks the liquid through channel 108. To achieve this in a reproducible way, outlets 106 and 112 must be provided with structures that define the liquid's surface by surface tension. A porous structure 14 as shown in FIG. 19 is satisfactory for this purpose. The evaporation of liquid contained within the fluidic channel 114 may be controlled by simple flaps 116 pressed on the fluid channel openings 106 and 112. Porous evaporators may be, according to FIGS. 15–17, put into lateral form as well as a vertical porous elements and may be fabricated during the same process used for fabrication of the filter by anodization.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for forming a lateral pore in a film having an in-plane extent and a vertical direction perpendicular thereto comprising:
   disposing a stress compliant mask on said film;
   defining a vertical hole through said stress compliant mask and into said film; and
   forming a lateral pore communication with the vertical hole in said film by anodization.

2. The method of claim 1 further comprising disposing a polymer layer on said stress compliant mask.

3. The method of claim 1 where said film has regions which will be porous and nonporous which regions have at least one boundary between them, and where disposing said stress compliant mask on said film comprises disposing a planarized stress compliant mask on said boundary of said film between of nonporous regions and porous regions.

4. The method of claim 2 where said film has regions which will be porous and nonporous which regions have at least one boundary between them, and where disposing said stress compliant mask on said film comprises disposing a planarized stress compliant mask on said boundary of said film between of nonporous regions and porous regions.

5. The method of claim 1 where disposing said stress compliant mask on said film comprises disposing on said film multiple composite mask layers.

6. The method of claim 5 where disposing multiple composite mask layers comprises disposing on said film at least a first layer bearing high intrinsic tensile stress and adjacent thereto at least a second layer bearing compressive stress.

7. The method of claim 5 where disposing multiple composite mask layers comprises disposing on said film at least a $SiO_2$ layer and disposed adjacent thereto at least a Si layer.

8. The method of claim 5 where disposing multiple composite mask layers comprises disposing on said film at least a SiC layer and disposed adjacent thereto at least a Si layer.

9. The method of claim 5 where disposing multiple composite mask layers comprises disposing on said film at least a $Si_3N_4$ layer and disposed adjacent thereto at least a $SiO_2$ layer.

10. The method of claim 1 where disposing said stress compliant mask on said film comprises disposing on said film a mechanically stable mask which withstands stress during anodization and counteracts pore formation stress to lead to pore ordering and directed growth.

11. The method of claim 10 where disposing said mechanically stable mask on said film comprises disposing a multilayer mask on said film having a composition of materials with different elastic properties such that tensile stress in said film is at least approximately matched to counteract compressive stress in said film caused by porous material growth.

12. The method of claim 1 where said film includes both porous material and nonporous material with a boundary therebetween and where disposing a stress compliant mask on said film comprises disposing a planarizing mask material that provides locally increased masking layer thickness at said boundary between nonporous and porous material in said film.

13. The method of claim 1 further comprising annealing said film to improve its polycrystalline structure and prepare it for ordered pore growth.

14. The method of claim 13 further comprising disposing a passivating layer on said film to avoid oxidation during annealing.

15. The method of claim 1 where forming said lateral pore in said film by anodization comprises defining a start hole through said stress compliant mask to said film with a rectangular geometry and then anodizing said film through said start hole with an approximately constant anodizing voltage.

16. The method of claim 1 where forming said lateral pore in said film by anodization comprises defining a start hole through said stress compliant mask to said film with a nonrectangular geometry of a pore formed thereby and then anodizing said film through said start hole with a time varying anodizing voltage dependent on said nonrectangular geometry.

17. The method of claim 16 where anodizing said film through said start hole with a time varying anodizing voltage dependent on said nonrectangular geometry of a pore formed thereby where said nonrectangular geometry is trapezoidal comprises varying said anodizing voltage, V, as $dy/dx$ $(V_0 v)/y_0 = dV/dt$, where $dy/dx$ is the change of width of said pore with respect to length of said pore, $V_0$ is the starting anodizing voltage, v is the rate of pore growth, and $y_0$ is the starting width of said pore.

18. The method of claim 16 where anodizing said film through said start hole with a time varying anodizing voltage dependent on said nonrectangular geometry of a pore formed thereby where said nonrectangular geometry is circular comprises varying said anodizing voltage, V, as $dV/dt = \pi V_0 v/y_0$, where $V_0$ is the starting anodizing voltage, v is the rate of pore growth, and $y_0$ is the starting diameter of said pore.

19. The method of claim 1 where disposing a stress compliant mask on said film comprises disposing a stress compliant mold on said film.

20. The method of claim 1 further comprising disposing a stress compliant mold on said stress compliant mask.

21. The method of claim 1 further comprising removing said stress complaint mask including said vertical hole defined therein and all other structures adjacent to said lateral pore except for a wall a nonporous material adjacent to said lateral pore to create at least one lateral test tube.

22. The method of claim 21 further comprising loading said test tube with a microsample by electromigration.

23. The method of claim 22 further comprising reading said microsample in said test tube by scanning electron microscopy.

24. The method of claim 22 further comprising marking said microsample in said test tube by a scanning electron microscope.

25. The method of claim 22 further comprising modifying said microsample in said test tube by a scanning electron microscope.

26. The method of claim 22 further comprising cutting said microsample in said test tube by a scanning electron microscope.

27. The method of claim 22 further comprising reading said microsample in said test tube by a near field optical microscope.

28. The method of claim 22 further comprising defining an aperture in said test tube for disposition of a tip of an atomic force microscope therein and reading said microsample in said test tube by atomic force microscopy.

29. The method of claim 22 further comprising defining an aperture in said test tube for disposition of a tip of an atomic force microscope therein and modifying said microsample in said test tube by atomic force microscopy.

30. The method of claim 1 where said lateral pore has a first and second end and further comprising:
    opening said first and second end of said pore;
    disposing a wire in said pore, said wire having a first and second opposing end; and
    contacting said first and second opposing end of said wire with electrical contacts.

31. The method of claim 30 where contacting said first and second opposing end of said wire with electrical contacts comprises forming said electrical contacts adjacent said first and second opposing end of said pore prior to said wire being disposed therein and contacting said first and second opposing end of said wire with said previously formed electrical contacts.

32. The method of claim 30 where contacting said first and second opposing end of said wire with electrical contacts comprises forming said electrical contacts adjacent said first and second opposing end of said pore after to said wire is disposed therein and contacting said first and second opposing end of said wire with said subsequently formed electrical contacts.

33. The method of claim 1 further comprising forming at least two interconnected lateral pores in said film.

34. The method of claim 33 where forming at least two interconnected lateral pores in said film comprises selectively disposing prior to anodization at least two interconnected nonporous channels of anodizable material in said film.

35. The method of claim 33 where forming at least two interconnected lateral pores in said film comprises anodizing at least two pores in said film by a first electric field pattern and anodizing an interconnection between said at least two pores by a second electric field pattern, said first and second electric field patterns having differing field orientations with respect to each to cause said at least two pores defined by said first electric field pattern to interconnect when further formed by said second electric field pattern.

36. The method of claim 33 further comprising:

disposing a first linear sample into a first one of said at least two interconnected lateral pores in said film by driving said first linear sample therein in a first direction;

disposing a second linear sample into a second one of said at least two interconnected lateral pores in said film by driving said second linear sample therein in a first direction; and joining said first and second linear samples together to form a junction between them by driving said first and second linear samples is a second direction opposing said first direction so that said first and second linear samples are driven together.

37. The method of claim 1 where a plurality of lateral pores are formed in a two dimensional array having a corresponding first array of pore openings and further comprising growing said two dimensional array of lateral pores into a corresponding spreading two dimensional array of lateral pores in said film by varying anodization voltage during growth such that a larger corresponding second array of pore openings is formed in communication with said first array of pore openings.

38. The method of claim 37 further comprising filling said lateral pores communicating said first array of pore openings with said second array of pore openings with a conductive material to form a multiprobe stage.

39. The method of claim 37 further comprising filling said lateral pores communicating said first array of pore openings with said second array of pore openings with a transparent material and coupling said pore openings of said second array with a near field optical microscope to form a nonscanning, pixelated SNOM.

40. The method of claim 37 further using said lateral pores communicating said first array of pore openings with said second array of pore openings as fluidic channels to form a liquid probe array.

41. The method of claim 1 further comprising defining another vertical hole through said stress compliant mask and into said film adjacent to an end of said lateral pore so that said lateral pore is opened at both opposing ends.

42. The method of claim 1 further comprising simultaneously forming at least two collinear lateral pores in said film in opposing collinear arms of a tee-shaped film having a central arm extending perpendicularly from and between said two opposing collinear arms of said tee-shaped film, and applying an anodizing voltage to said central arm during further growth of said at least two collinear lateral pores into said central arm so that said collinear lateral pores interconnect with each other so that an open filter element is formed in said tee-shaped film.

43. The method of claim 1 where said lateral pore has a closed backside and further opening said closed backside of said lateral pore by etching away nonporous material under said stress compliant mask adjacent to said closed backside to open said lateral pore at both ends.

44. The method of claim 43 further comprising disposing an etch-resistant layer beneath an anodizing electrode used in formation of said lateral pore.

45. The method of claim 1 where said stress compliant mask is an anodization hardmask and further comprising removing a nonporous block under said anodization hardmask and then forming said lateral pore in nonporous material previously adjacent to said nonporous block so that a fluidic channel is formed laterally underneath said anodization hardmask.

46. The method of claim 1 where said stress compliant mask is an anodization hardmask and further comprising removing a sacrificial block under said anodization hardmask and then forming said lateral pore in material adjacent to said sacrificial block so that a fluidic channel is formed laterally underneath said anodization hardmask.

47. The method of claim 45 further comprising disposing a molding over said anodization hardmask and fluidic channel.

48. The method of claim 46 further comprising disposing a molding over said anodization hardmask and fluidic channel.

49. The method of claim 1 further comprising forming at least two lateral pores in said film by anodization at different times, said two lateral pores having correspondingly different diameters so that lateral filters of different sizes are formed.

50. The method of claim 1 further comprising forming at least two lateral pores in said film by anodization with different electric fields, said two lateral pores having correspondingly different diameters so that lateral filters of different sizes are formed.

51. The method of claim 50 further comprising providing a voltage divider, forming at least two lateral pores in said film by anodization with different electric fields, said different electric fields provided by corresponding different electrodes adjacent to said film, said corresponding different electrodes coupled to said voltage divider, said two lateral pores having correspondingly different diameters so that lateral filters of different sizes are formed.

52. The method of claim 44 further comprising using said anodizing electrode and etch-resistant layer as a passivated electromigration electrode for said adjacent opened pore.

53. The method of claim 1 further comprising forming a plurality of said lateral pores to create a lateral filter in a fluidic channel within said film and vapor pumping liquid through said filter.

54. The method of claim 53 where said fluidic channel has at least outlet port and further comprising forming another plurality of said lateral pores to create a filter at said at least one outlet port so that an evaporator membrane is formed for said vapor pumping.

55. The method of claim 54 where forming said plurality of said lateral pores to create a lateral filter in a fluidic channel and forming said other plurality of said lateral pores to create a filter at said at least one outlet port are performed simultaneously.

56. The method of claim 54 further comprising providing an external flap disposed over said filter at said at least one outlet port for evaporation control.

* * * * *